United States Patent [19]

Stolpin

[11] 4,423,926

[45] Jan. 3, 1984

[54] PARABOLIC COLLECTOR

[76] Inventor: Roger M. Stolpin, 3136 Quick Rd., Holly, Mich. 48442

[21] Appl. No.: 368,071

[22] Filed: Apr. 14, 1982

[51] Int. Cl.³ .............................................. F24J 3/02
[52] U.S. Cl. ..................................... 350/292; 126/438
[58] Field of Search ...................... 126/438, 451, 439; 350/292, 293

[56] References Cited

U.S. PATENT DOCUMENTS

| | | | |
|---|---|---|---|
| 1,424,932 | 8/1922 | Moreau | 126/451 |
| 2,806,134 | 9/1957 | Tarcici | 350/292 |
| 4,171,876 | 10/1979 | Wood | 350/292 |

Primary Examiner—Carroll B. Dority, Jr.
Attorney, Agent, or Firm—Brooks & Kushman

[57] ABSTRACT

A parabolic collector (10) is disclosed as including a plurality of molded plastic panels (12) secured to each other to define a dish type parabolic shape having a central axis A. Each panel (12) has sides including lugs (14,16) that snap into engagement with the lugs on the adjacent panels to secure the panels to each other. A collecting surface (18) of each panel has a segmental parabolic shape bounded by the sides of the panel. Each set of panels spaced from the central axis A a given distance have the identical construction as each other to facilitate molding of the panels. Except for central triangular panels, each of the panels are quadrilateral with truncated wedge shapes. Each quadrilateral panel has inner and outer curved sides (30,32) one of which includes male lugs (14) and the other of which includes female lugs (16) for securing the panels to adjacent panels. Each quadrilateral panel also includes radial sides (34,36) one of which includes male lugs and the other of which includes female lugs for securing the panels to adjacent panels.

8 Claims, 8 Drawing Figures

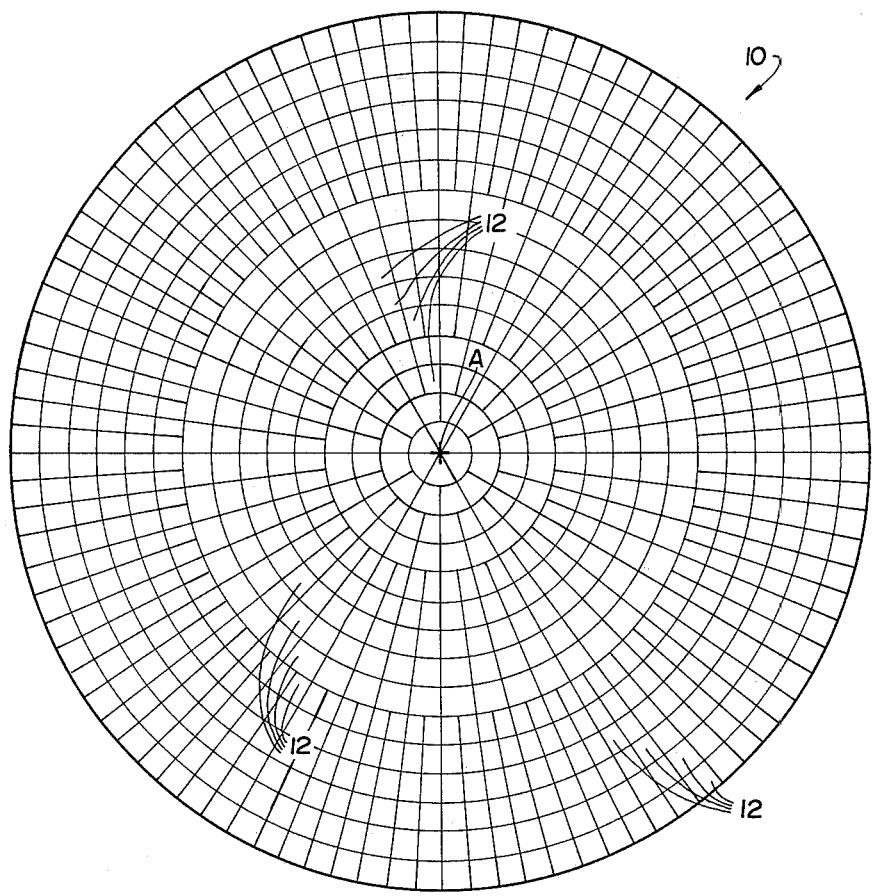
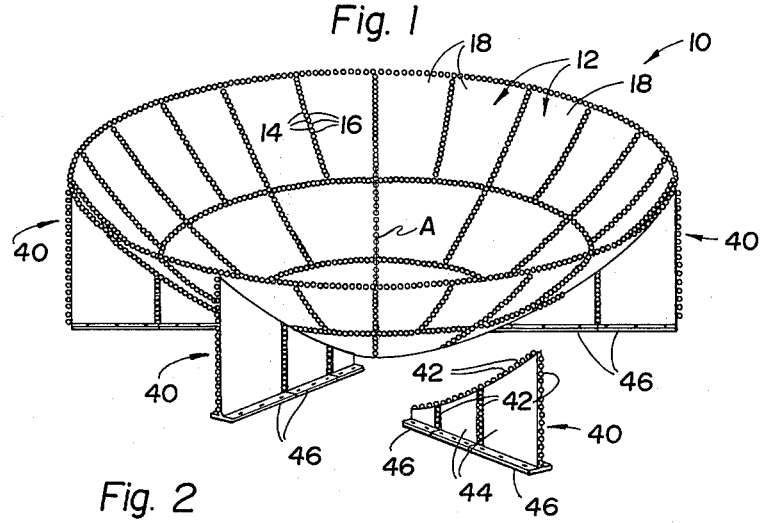
Fig. 1
Fig. 2

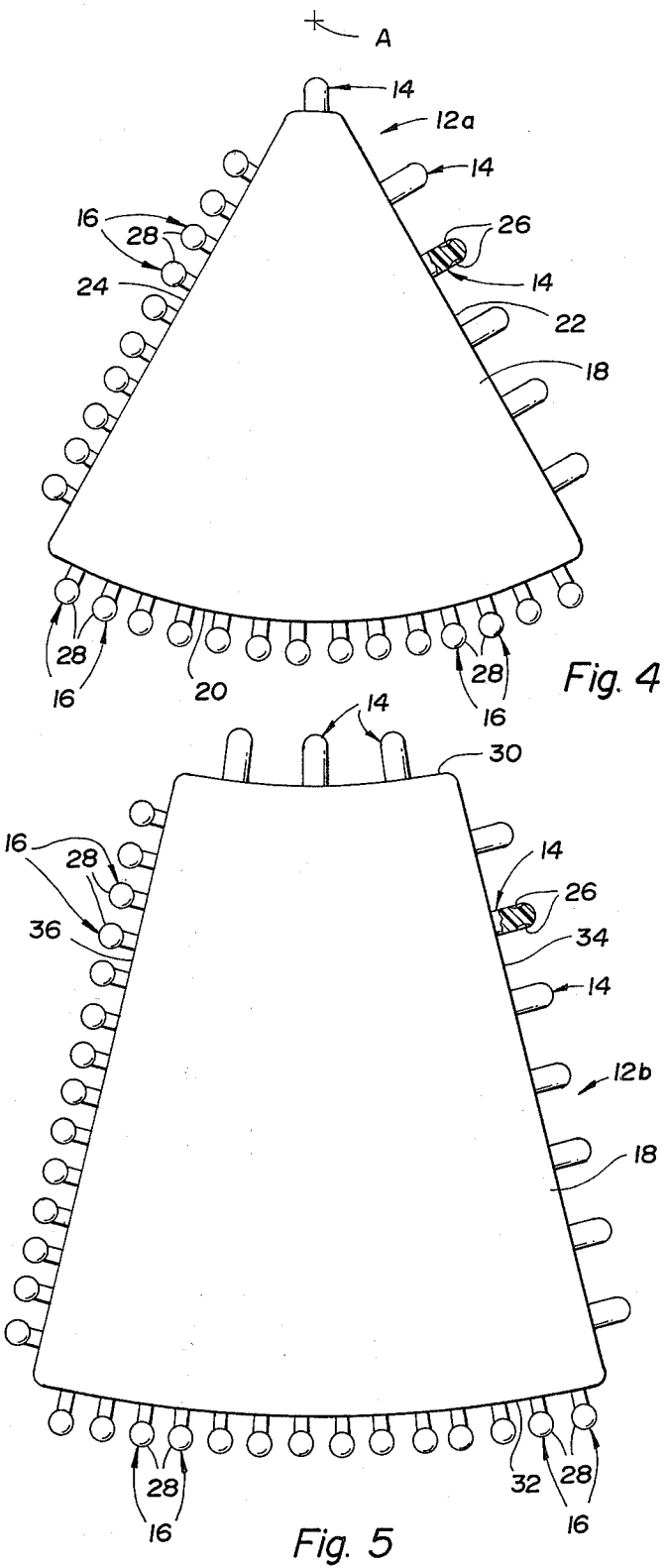

PARABOLIC COLLECTOR

TECHNICAL FIELD

This invention relates to a parabolic collector for use in collecting solar energy, microwaves, or other electromagnetic radiation.

BACKGROUND ART

Collection of solar energy, microwaves, and other electromagnetic radiation is conventionally performed by parabolic collectors in order to concentrate the radiation at the focus of each collector. While both trough and dish shaped collectors have previously been utilized, greater concentration of the collected radiation is possible with the dish type parabolic collectors due to their focus at a point rather than along a line as is the case with trough type parabolic collectors. Conventional parabolic collectors include panels which are stamped from flat metal to a parabolic shape. To facilitate manufacturing of the parabolic panels, it is conventional to make the panels small enough so that the stamping dies do not have to be excessively large. However, decreasing the size of the panels makes it somewhat difficult to support and properly position each panel without making the collector so costly that it is not economically practical.

DISCLOSURE OF INVENTION

An object of the present invention is to provide an improved parabolic collector of the dish type having a construction which is efficient in use as well as being economical to manufacture.

In carrying out the above object, a parabolic collector constructed in accordance with the present invention includes a plurality of molded plastic panels secured to each other to define a dish type parabolic shape having a central axis. Each panel has sides including lugs that snap into engagement with the lugs on the adjacent panels to provide the securement of the panels to each other. A collecting surface of each panel has a segmental parabolic shape that is bounded by the sides of the panel on which the lugs are mounted. Each set of panels spaced from the central axis a given distance has an identical construction as each other so as to facilitate molding of the panels.

In the preferred construction disclosed, the collector includes triangular panels immediately adjacent its central axis. The triangular panels include outer sides having lugs for providing securement thereof to the panels located immediately adjacent thereto in an outward radial direction from the central axis. Each triangular panel includes a pair of radial sides that extend inwardly from the opposite ends of its outer side to a vertex with each other. One of the radial sides of each triangular panel includes male lugs and the other radial side includes female lugs for receiving the male lugs on the adjacent triangular panel.

Outwardly from the triangular panels, the collector includes quadrilateral panels having generally truncated wedge shapes. Each of the quadrilateral panels includes inner and outer curved sides. One of the curved sides of each quadrilateral panel includes male lugs and the other curved side thereof includes female lugs for securing the panel to the adjacent panels. Each quadrilateral panel also has a pair of radial sides that extend between the opposite ends of its inner and outer curved sides. One of the radial sides of each quadrilateral panel includes male lugs and the other radial side thereof includes female lugs for receiving the male lugs on the adjacent quadrilateral panel.

The collector also preferably includes supports having lugs that engage the lugs on the panels to maintain the parabolic shape. As disclosed, the supports extend radially with respect to the central axis of the collector and also have lugs that secure panels of each support to each other.

The objects, features, and advantages of the present invention are readily apparent from the following detailed description of the best mode for carrying out the invention when taken in connection with the accompanying drawings.

BRIEF DESCRIPTION OF DRAWINGS

FIG. 1 is a schematic axial view of a dish type parabolic collector constructed in accordance with the present invention;

FIG. 2 is an enlarged perspective view of the central portion of the collector;

FIG. 4 is an enlarged view illustrating the central triangular panel construction shown in FIG. 3;

FIG. 5 is an enlarged view illustrating one of the quadrilateral panel constructions shown in FIG. 3;

BEST MODE FOR CARRYING OUT THE INVENTION

Figure 3:
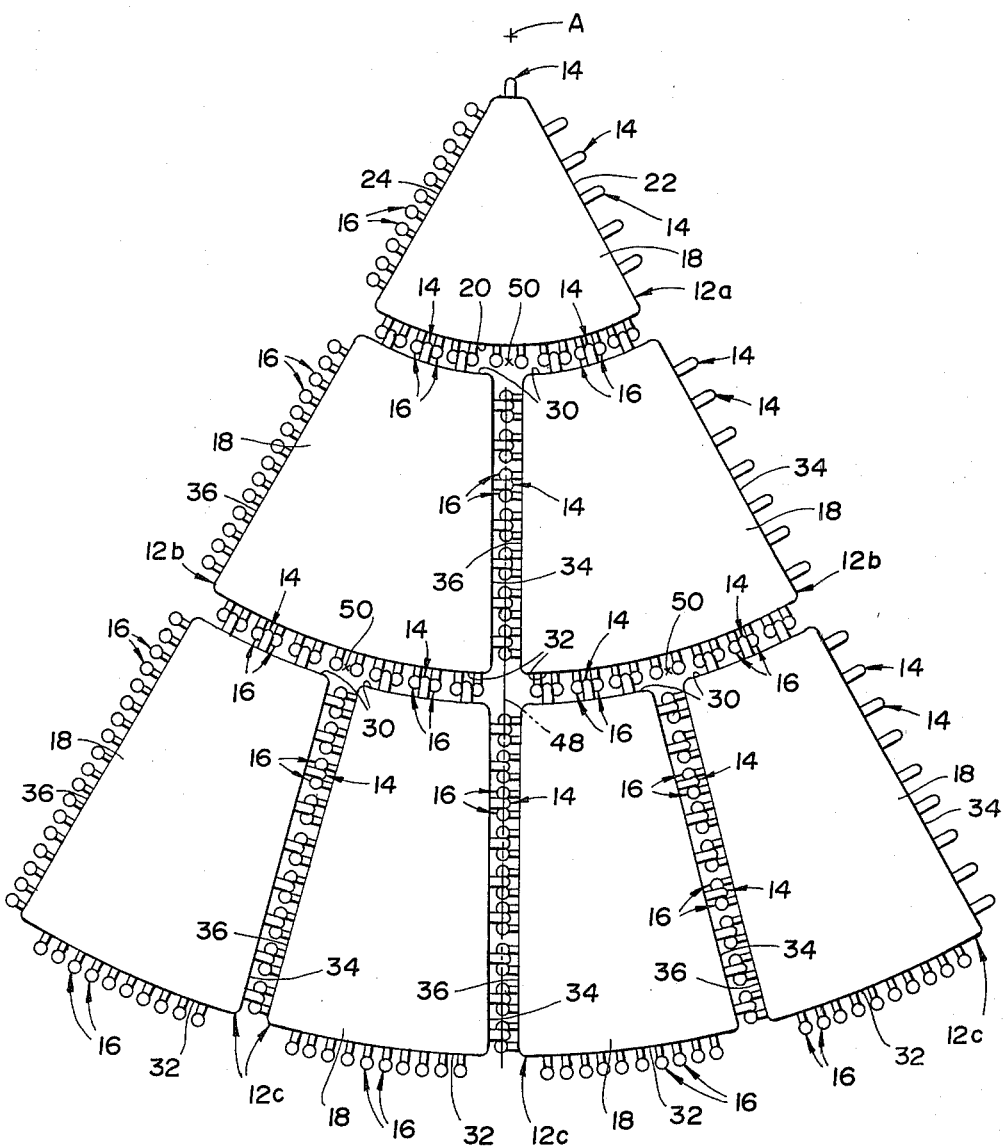
FIG. 3 is a view illustrating the construction of central triangular and quadrilateral panels of the collector.
Figure 6:
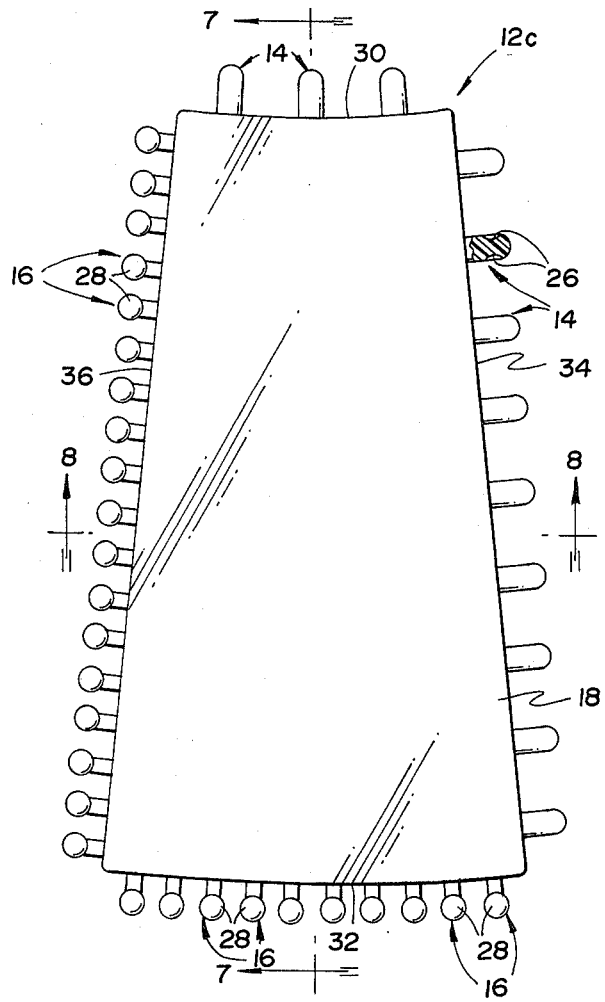
FIG. 6 is an enlarged view illustrating another quadrilateral panel construction shown in FIG. 3.

Referring to FIGS. 1 and 2, a parabolic collector constructed in accordance with the present invention is generally indicated by reference numeral 10 and includes a plurality of unitary molded plastic panels 12 secured to each other to define a dish type parabolic shape having a central axis A. Each panel 12 includes sides having lugs 14 and 16 (FIG. 3) that snap into engagement with the lugs on adjacent panels to provide securement of the panels to each other. Each panel 12 has a collecting surface 18 (FIG. 2) of a segmental parabolic shape bounded by the sides of the panel and positioned so as to direct electromagnetic radiation toward the focus of the parabolic shape. As is hereinafter more fully described, each set of panels 12 spaced from the central axis A a given distance have the identical construction as each other in order to facilitate molding of the collector.

With combined reference to FIGS. 3 and 4, the collector includes generally triangular panels 12a located immediately adjacent the central axis A about which the parabolic shape of the collector is generated. The triangular panels 12a include outer sides 20 having lugs 16 thereon for providing securement thereof to the panels located immediately adjacent thereto in an outward radial direction from the central axis A. As illustrated, cooperating pairs of female lugs 16 are mounted on the outer sides 20 of the triangular panels 12a and receive associated male lugs 14 on the panels located immediately adjacent thereto in an outward radial direction from the central axis A. Outer side 20 of each triangular panel 12a preferably has a curved shape extending about the central axis A with the female lugs 16 spaced between its ends.

As seen in FIGS. 3 and 4, each triangular panel 12a also includes a pair of radial sides 22 and 24 extending from the opposite ends of its curved outer side 20 inwardly toward the central axis A. One of the radial sides 22 has spaced male lugs 14 while the other radial side 24 has cooperating pairs of spaced female lugs 16. Each male lug 14 is aligned with a cooperating pair of female lugs 16 and, as illustrated in FIG. 4, has a pair of oppositely facing depressions 26. Upon assembly of the triangular panels 12a, each male lug 14 is inserted between the aligned female lugs 16 on the adjacent triangular panel such that balls 28 on the outer ends of the female lugs are received within the depressions 26 in the male lug with a snap action that secures the triangular panels to each other. Likewise, the female lugs 16 on the outer curved sides 20 of the triangular panels 12a are also secured by a snap action to the male lugs on the adjacent panels. Each triangular panel 12a also includes a male lug 14 at its central vertex defined by the inner ends of the radial sides 22 and 24. A suitable central connector having female lugs may be used to connect these central male lugs by a snap action in order to secure all of the triangular panels to each other.

As illustrated in FIG. 1, each of the panels 12 located outwardly from the central triangular panels has a quadrilateral construction with a generally truncated wedge shape. Two of such panels are illustrated in FIGS. 3 through 6 and will be described in detail with the understanding that the other quadrilateral panels have a similar construction. Also, it should be noted that the panels are made small enough so as to facilitate molding and handling of the panels during assembly. At appropriate intervals where the outer side of each panel approaches the maximum size desired, the next set of panels is divided so that two panels are secured thereto by the lug type connections previously described.

With reference to FIGS. 3 through 6, two of the quadrilateral panels 12b and 12c will be described with the understanding that the other quadrilateral panels have a similar construction such that the description is applicable to these other quadrilateral panels as well. Each of the quadrilateral panels 12b and 12c includes inner and outer curved sides 30 and 32. As illustrated, the inner curved side 30 of each quadrilateral panel has male lugs 14 mounted thereon and the outer curved side 32 thereof has female lugs 16 mounted thereon for providing securement of the panels to each other. However, it is also possible to reverse the respective positions such that the male lugs 14 are mounted on the outer curved side 32 of each quadrilateral panel and the female lugs 16 are mounted on the inner curved side 30. A pair of radial sides 34 and 36 of each quadrilateral panel extend between the opposite ends of the inner and outer curved sides 30 and 32. One of the radial sides 34 of each quadrilateral panel has male lugs 14 spaced along its length while the other radial side 36 has female lugs 16 for receiving the male lugs on the adjacent quadrilateral panel.

During assembly of the quadrilateral panels, the male lugs 14 on both the curved inner side 30 and the one radial side 34 of each panel are inserted by a snap action connection between the associated female lugs 16 on the adjacent panels. Likewise, the female lugs 16 on the outer curved side 32 and the other radial side 36 of each quadrilateral panel receive male lugs on the adjacent panels with a snap action connection that secures the panels to each other.

Figure 7:
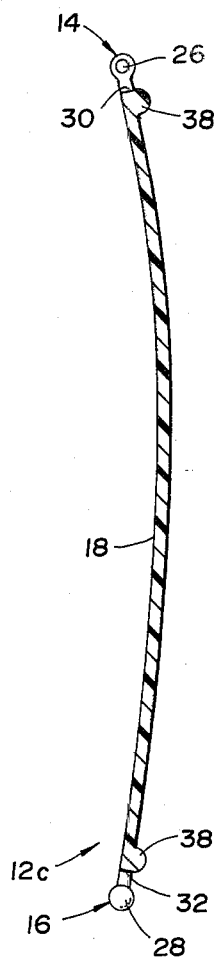
FIG. 7 is a sectional view through the panel shown in FIG. 6 taken along line 7—7 thereof.
Figure 8:
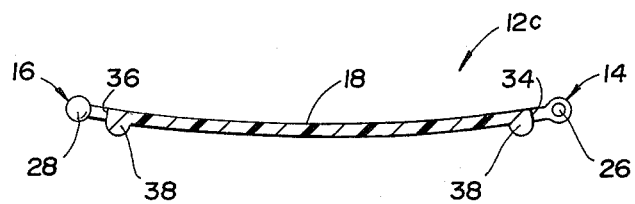
FIG. 8 is a sectional view taken through the panel of FIG. 6 taken along line 8—8.

As illustrated in FIG. 7, the collecting surface 18 of each quadrilateral panel extends between its inner and outer sides 30 and 32 with a segmental parabolic shape so as to reflect electromagnetic radiation received by the collector toward its focus. As illustrated in FIG. 8, the collecting surface 18 of each quadrilateral panel has an arcuate shape extending between its radial sides 34 and 36 about the central axis of the collector. Each of the panel sides 30, 32, 34, and 36 preferably has a peripheral rib 38 so as to provide strengthening that maintains the shape of the collecting surface 18. Also, a suitable coating may be provided on the collecting surface 18 in order to enhance the reflection of electromagnetic radiation toward the focus of the collector. For example, when utilized as a solar collector, a mirror coating is plated on the collecting surface 18 to provide reflection of light waves toward the focus of the collector.

With reference to FIG. 2, collector 10 also includes supports 40 having lugs 42 that engage the lugs on the collector panels to maintain the parabolic shape of the collector. Supports 40 extend radially with respect to the central axis A of the collector and are preferably made of panels 44 that are secured to each other by lugs 42 of each panel. Each panel 44 is illustrated as having a lower flange 46 for mounting of the support on a suitable base. These flanges 46 may be coplanar with each other as illustrated for mounting on a planar surface of the base or may be arranged so as to be mounted on stepped surfaces of the base so as to limit the height of the support panels 44. The lugs 42 that secure the supports 40 to the lugs of the panel may function in either of two different ways. Referring to FIG. 3, it is possible for the lugs of the support to be forced between the adjacent female lugs 16 along the radial connections between the panels such as illustrated by reference line 48. Also, at each location where the panels divide from one to two moving in an outward radial direction, such as locations 50 shown in FIG. 3, the outer curved panel side has a vacent lug space where a snap connection can be made to secure the panel to one of the supports.

While the best mode for carrying out the invention has been described in detail, those familiar with the art to which this invention relates will recognize various alternative designs and embodiments for practicing the invention as defined by the following claims.

What is claimed is:

1. A parabolic collector comprising: a plurality of molded plastic panels secured to each other to define a dish type parabolic shape having a central axis; each panel having sides including lugs that snap into engagement with the lugs on adjacent panels to provide the securement of the panels to each other; each panel having a collecting surface of a segmental parabolic shape bounded by the sides of the panel; and each set of panels spaced from the central axis a given distance having the identical construction as each other.

2. A collector as in claim 1 which includes panels immediately adjacent the central axis of a generally triangular shape; said triangular panels including outer sides having lugs for providing securement thereof to the panels located immediately adjacent thereto in an outward radial direction; each triangular panel including a pair of radial sides; and one of said radial sides on each triangular panel including male lugs and the other including female lugs for receiving the male lugs on the adjacent triangular panel.

3. A collector as in claim 1 or 2 which includes quadrilateral panels having generally truncated wedge shapes; each of said quadrilateral panels including inner and outer curved sides; one of said curved sides on each quadrilateral panel including male lugs and the other curved side thereof including female lugs for securing the panel to the adjacent panels; each quadrilateral panel also having a pair of radial sides; and one of said radial sides on each quadrilateral panel including male lugs and the other including female lugs for receiving the male lugs on the adjacent quadrilateral panel.

4. A collector as in claim 1 further including supports having lugs that engage the lugs on the panels to maintain the parabolic shape.

5. A parabolic collector comprising: a plurality of molded plastic quadrilateral panels secured to each other to define a dish type parabolic shape having a central axis; each of said panels having a generally truncated wedge shape including inner and outer curved sides as well as a pair of radial sides; each panel side having lugs that snap into engagement with the lugs on the adjacent panel sides to provide securement of the panels to each other; said panel each having a collecting surface of a segmental parabolic shape bounded by the sides of the panel; and each set of panels spaced from the central axis a given distance having the identical construction as each other.

6. A parabolic collector comprising: a plurality of molded plastic quadrilateral panels secured to each other to define a dish type parabolic shape having a central axis; each of said panels having a generally truncated wedge shape including inner and outer curved sides as well as a pair of radial sides; one of said curved sides on each panel including male lugs and the other curved side including female lugs for snapping into engagement with the lugs on the adjacent panels; one of the radial sides on each panel including male lugs and the other including female lugs for snapping into engagement with the lugs on the radial sides of the adjacent panels; each panel having a collecting surface of a segmental parabolic shape bounded by the sides of the panel; and each set of panels spaced from the central axis a given distance having the identical construction as each other.

7. A collector as in claim 6 which further includes triangular panels immediately adjacent the central axis; said triangular panels including curved outer sides having lugs for providing securement thereof to the curved inner sides of the quadrilateral panels located immediately adjacent thereto in an outward radial direction; each triangular panel also including a pair of radial sides; and one of said radial sides on each triangular panel including male lugs and the other including female lugs for receiving the male lugs on the adjacent triangular panel.

8. A collector as in claim 6 or 7 which includes a plurality of radially extending supports having lugs that engage the lugs on the panels to maintain the parabolic shape.

* * * * *